United States Patent [19]

Berger

[11] 4,271,763
[45] Jun. 9, 1981

[54] PROXIMITY DETECTOR

[76] Inventor: Philip H. Berger, 2250 Pheasant Way, Salt Lake City, Utah 84121

[21] Appl. No.: 905,871

[22] Filed: May 15, 1978

[51] Int. Cl.³ .......................................... B61B 12/06
[52] U.S. Cl. .................................. 104/179; 104/116; 200/61.18; 324/228; 335/207; 340/677; 361/180
[58] Field of Search ................. 104/173 ST, 178, 179, 104/112, 115, 116; 335/207, 205; 200/61.13, 61.18; 361/180; 340/537, 677; 246/249; 324/228, 235

[56] References Cited

U.S. PATENT DOCUMENTS

| | | | |
|---|---|---|---|
| 3,115,847 | 12/1963 | Turner et al. | 104/115 X |
| 3,179,856 | 4/1965 | Kuhrt et al. | 361/180 |
| 3,302,588 | 2/1967 | Bennett | 104/178 |
| 3,373,387 | 3/1968 | Irasek | 335/207 |
| 3,562,603 | 2/1971 | Smith | 246/249 X |
| 3,796,850 | 3/1974 | Moreland et al. | 335/207 X |
| 3,869,662 | 3/1975 | Der Marderosian et al. | 324/235 X |
| 3,991,413 | 11/1976 | Berger | 340/537 |
| 4,096,437 | 6/1978 | Kitzinger et al. | 324/235 X |

FOREIGN PATENT DOCUMENTS

| | | | |
|---|---|---|---|
| 868698 | 4/1971 | Canada | 104/173 ST |
| 421169 | 3/1967 | Switzerland | 104/112 |

Primary Examiner—Randolph A. Reese
Attorney, Agent, or Firm—Trask & Britt

[57] ABSTRACT

A proximity detector has permanent magnets positioned within a chassis so that the axis and poles of the flux field of the permanent magnet are substantially normal to the front of the chassis. A switch is positioned along the front of the chassis proximate the magnet. The switch has contacts operable by the magnetic flux field of the magnet. A shield is positioned between the magnet and the rear of the chassis and between the switch and the rear of the chassis. The shield acts to inhibit extraneous magnetic fields from interferring with the detector operation and as a magnetic conductor to focus the magnetic flux field. The flux field of the permanent magnet is modified by a ferromagnetic object positioned at a predetermined distance from the front of the chassis to cause the contacts of the switch to operate in relation to the positioning thereof and in turn send an operate signal indicative of the positioning of the ferromagnetic object at the front of the switch to an external circuit. The switch may be positioned on a ski lift tower to detect the proximity of the ski lift cable and in turn transmit a derope condition signal should the cable become dislodged from tower support apparatus. A test device may be attached to the cable and circulated to test in-place detectors.

10 Claims, 9 Drawing Figures

PROXIMITY DETECTOR

BACKGROUND OF THE INVENTION

1. Field

This invention relates to proximity detectors. More particularly, this invention relates to proximity detectors of the type to detect the proximity of a ferromagnetic object and to proximity detectors for use with ski lifts for detecting a derope condition of the cable of the ski lift system.

2. State of the Art

Switches or devices to determine the proximity of an object have long been known. Such devices operate on a variety of principles including mechanical, electrical, magnetic and combinations thereof.

In recent years, magnetic proximity detectors have achieved some acceptance. U.S. Pat. No. 3,562,603 (Smith) discloses such a detector. In particular, it discloses a detector having a permanent magnet and a reed switch. The switch is operable by the magnetic flux field associated with the permanent magnet. A variety of other proximity switches are also commercially available. For example, the Honeywell Corporation of Minneapolis, Minn. has available model "4FR" and model "6FR" proximity switches which operate as a single-pole single-throw switch using magnets in association with a magnetically operated reed switch.

In practice, the above switches and others heretofore known have positioned permanent magnets with the axis and poles of their flux fields oriented substantially or essentially parallel to the front of the detector. When a ferromagnetic object approaches the detector front, the magnetic field of the permanent magnet is modified in such a way as to cause the reed switch to close or open. The permanent magnets used are typically elongated bar magnets oriented parallel to the face, front or detecting surface of the detector. In the case of the 4FR and 6FR switches made by the Honeywell Corporation, one elongated bar magnet is positioned along and parallel to the sensing face. A second permanent magnet is spaced away from the first. The reed switch is in between the two magnets. Such an arrangement exposes the detector to influence from stray magnetic fields and to influence from magnetic objects behind and around the detector. Indeed, such detectors may not be reliable when used in environments having a substantial magnetic environment such as one having substantial surrounding steel structure and in environments where the detector is subjected to significant vibration.

In practical application, particularly in adverse weather environments, proximity switches such as those described above, have proven to be less than effective. For example, in cold weather conditions, such as that found in environments associated with the sport of snow skiing and the use of ski chair lifts (personnel transport systems), a wide variation in temperature may be experienced. Temperatures well below 0° F. and large amounts of moisture in the form of snow and ice may be experienced. Ski lifts typically include a plurality of towers positioned up the side of a slope or a mountain. A steel or iron cable is supported by the towers and moved in a continuous loop fashion by a driving apparatus. Chairs holding the skiers or other persons are suspended from the cable. The individual towers typically have grooved wheels to rotatably support the cable. Should the cable become removed or derailed from the grooves of the wheel(s), a "derope" condition would exist. Such a condition can be a hazard to the people riding on the chairs. Accordingly, it is typically necessary that the ski lift system be immediately shut down to minimize the hazard to which the people are exposed. Proximity detectors are positioned on the towers proximate the cable or rope to detect its proximity or proper position in the grooved wheels which support the cable on the ski lift tower.

Reliable proximity switches have heretofore been unknown for application not only for the ski lift environment but also in other environments. Further, proximity switches heretofore having sufficient detection range and having characteristics such that the metal associated with the ski lift tower and its associated apparatus does not adversely affect operation of the proximity detector or unduly constrain detector positioning are heretofore unknown. A detector system having means to test proximity detectors when installed is also heretofore unknown.

Other known detecting devices which may be of interest include devices disclosed in the following U.S. Pat. Nos.: 3,058,059 (Bockemuehl); 3,504,236 (Takesimoyagawa et al); 3,761,736 (Edge et al) disclosing a capacitive touch proximity detector; 3,048,748 (Carey); 3,377,519 (Stong); 3,176,096 (Marcum); and 3,161,742 (Bagno); and 3,736,445 (Van Sickle).

SUMMARY OF THE INVENTION

A detector for detecting the proximity of a ferromagnetic object has a chassis. Magnet means are positioned within the chassis proximate the front thereof. The magnet means is oriented within the chassis to have the magnetic poles of its flux field substantially normal to the front of the chassis. The magnetic flux field of the magnetic field passes through the front of the chassis. A switch is positioned within the chassis proximate the front. The switch has contacts operable by the magnetic flux field. The switch is positioned within the chassis so that the magnetic flux field of the magnet may operate the contacts. Conductors connect the switch to connector means for connection to an external circuit. Shield means to shield extraneous magnetic fields from the magnets and the switch and to focus the magnetic flux field is positioned within the chassis between the rear of the chassis and the magnet means and between the rear of the chassis and the switch. The flux field is modified by a ferromagnetic object positioned at a predetermined distance from the front of the chassis to cause the contacts of the switch to operate and in turn send an operate signal to the external circuit.

The shield means is preferably an elongated bar constructed of a ferromagnetic material. A non-ferromagnetic member may be positioned proximate the front of the chassis. It is formed to receive the switch. The switch is perferably a hermetically sealed reed switch which is encased with a thin layer of resilient non-ferromagnetic material which may be heat shrinkable tubing. The non-ferromagnetic member is preferably elongated in length and is formed to snugly receive the magnet means therewithin. The magnet means is preferably comprised of two adjacent cylindrically shaped permanent magnets having magnetic flux fields with axes substantially normal to the front of the chassis. In turn, their respective north and south poles are oriented normal to the chassis front. The shield is most preferably an elongated bar. Most preferably, the hermetically sealed switch may have ferromagnetic tabs attached to its extending conductors.

In another embodiment, the detector includes mounting means adapted to the chassis for mounting the detector to a ski lift tower proximate a ski lift cable. Test means may be provided which are comprised of a magnet means and attachment means for removably attaching the magnet means to the cable for circulation past proximity detectors mounted to said towers.

BRIEF DESCRIPTION OF THE DRAWINGS

In the drawings, which illustrate the best mode presently contemplated for carrying out the invention.

DESCRIPTION OF THE ILLUSTRATED EMBODIMENT

Figure 1:
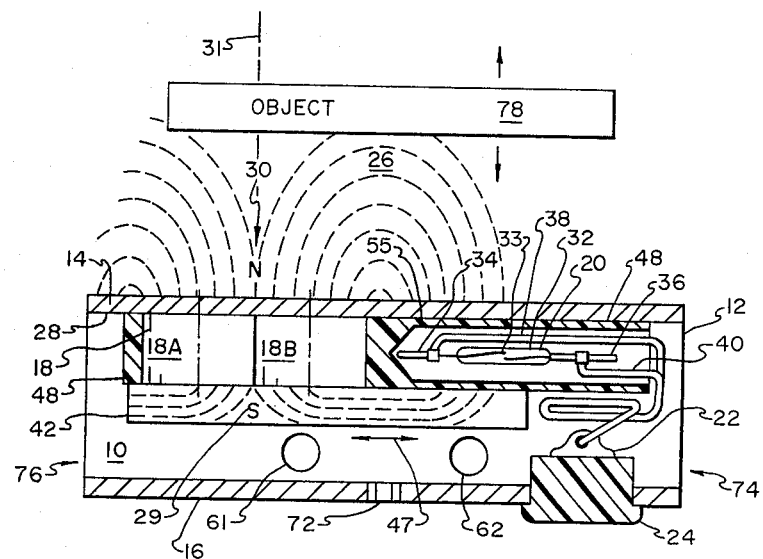
FIG. 1 is a cross-sectional top view of a proximity detector of the instant invention.

The proximity detector of the instant invention is generally indicated by the numeral 10 in FIG. 1. It has a substantially non-ferromagnetic chassis 12 which has a front side 14 and a rear side 16. The detector 10 also has magnet means 18, a switch 20, and conductor means 22 which is connected to a connector 24 for subsequent connection to an external circuit (not shown). The magnet means 18 is comprised of two permanent magnets 18A and 18B. The permanent magnets 18A and 18B are positioned within the chassis 12 proximate the front 14. The magnets 18A and 18B are oriented so that their flux fields generally indicated by the numeral 26 combine to form north and south magnetic poles 29 and 30. The axis 31 of the flux field 26 is substantially normal to the front 14 of the chassis 12. Preferably, the permanent magnets 18A and 18B are positioned to snugly face the inside surface 28 of the front 14 to form a north magnetic pole 30 on the front side 14 of the chassis 12. It may be noted that the use of two permanent magnets 18A and 18B has proven to be most desirable to form the desired magnetic flux field 26 as determined by empirical evaluation. Those skilled in the art will recognize that other magnet forms including, for example, electromagnets, may be used in lieu of the two circular permanent magnets, 18A and 18B. The circular permanent magnets 18A and 18B are preferred to provide most reliable operation, to minimize the cost of construction and to produce the most preferred magnetic field. It may also be noted that the north and south poles can be reversed for some applications.

The switch 20 has contacts operable by the magnetic flux field 26 of the permanent magnets 18A and 18B. The switch 20 is positioned proximate the magnets 18A and 18B and proximate the front 14 of the chassis 12 so that the contacts of the switch 20 are within the magnetic flux field 26 of the magnets 18A and 18B. The switch 20 is preferably what those skilled in the art may regard as a hermetically sealed reed switch. One such switch, the MDRR-4, is commercially available from Hamlin, Inc. of Lake Mills, Wis. The switch 20 has contacts within the hermetically sealed chamber 32. The contacts 33 are here arranged so that the switch 20 is a simple single-pole single-throw switch. Conductors 34 and 36 extend external the hermetically sealed container 32 and are connected by solder connections and conductors 38 and 40 which constitute the connector means 22 to the connector 24.

Figure 9:
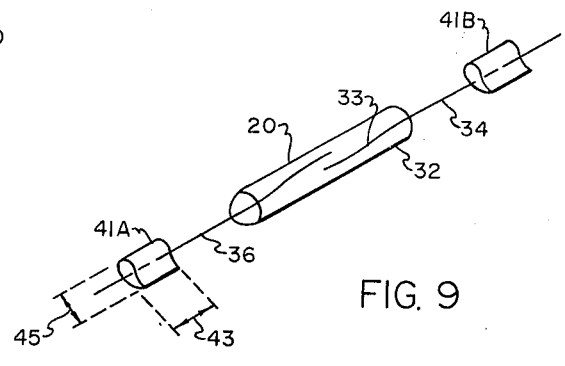
FIG. 9 is a perspective view of a magnetic switch.

FIG. 9 shows the switch 20 with ears or tabs 41A and 41B fastened to the conductors 34 and 36. The tabs 41A and 41B are pieces of soft iron or core iron which empirically have been found to improve the reliability and sensitivity of the detector by apparently acting as conductors and collectors of magnetic flux to enhance and stabilize the magnetic field 26 as it passes through the switch 20 to the shield 42. The tabs 41A and 41B here shown are small thin pieces of core iron which are folded over the conductors 34 and 36 and crimped thereto. The tabs are sized from about five to about fifteen millimeters in length 43 and from about one to about eight millimeters in width 45. The thickness may vary from 0.5 millimeters to about 2 millimeters. Those skilled in the art will recognize that other materials of differing dimensions and iron type materials of differing dimensions may be used as the tabs 41A and 41B. That is, tabs made of other ferromagnetic materials and/or dimensioned differently than the described preferred tabs may be used to act as collectors and conductors.

Figure 2:
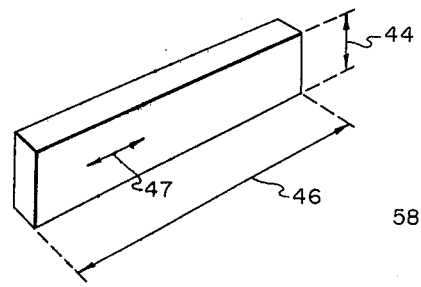
FIG. 2 is a perspective view of the shield means for use with a detector of the instant invention.
Figure 4:
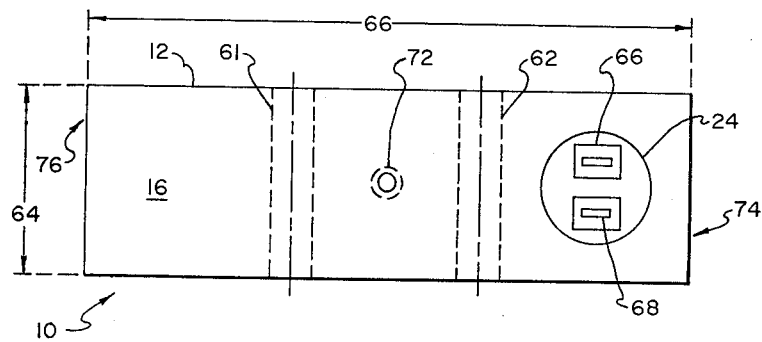
FIG. 4 is a rear view of a proximity detector of the instant invention.
Figure 5:
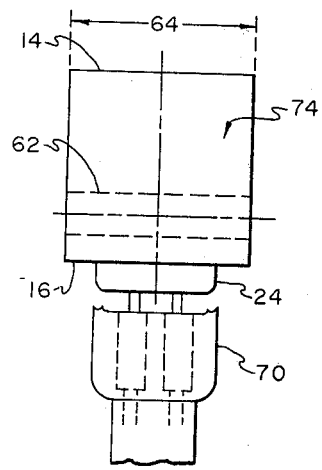
FIGS. 5 and 6 are end views of a proximity detector of the instant invention.

A shield 42 (FIG. 1) is positioned within the chassis 12 between the magnets 18A and 18B and the rear of the chassis 16. It is also positioned to be between the rear of the chassis 16 and the switch 20. The shield 42 (FIG. 2) is preferably an elongated member sized in height 44 to substantially the height 64 (FIG. 4) of the chassis 12. It is sized in length 46 to extend the width of the magnets and a substantial portion of the length of the switch 20 as shown in FIG. 1. The shield 42 is preferably made of a soft core iron or soft iron. In manufacture, it has been found to be most preferable to deburr the edges on the shield 42 rather than shear cut. Deburring avoids imparting non-uniform magnetic characteristics to the shield 42. The shield 42 acts to shield the magnets 18A, 18B and the switch 20 from stray magnetic fields behind the detector 10 typically associated with steel and metal mounting devices and steel and metal apparatus to which the detector 10 is mounted. The shield 42 also acts to focus the magnetic field 26 of the magnets 18A and 18B through the switch 20 to improve detector reliability, range and sensitivity. The shield 42 is positioned lengthwise 47 in assembly to provide for desired operation of the switch 20.

Figure 3:
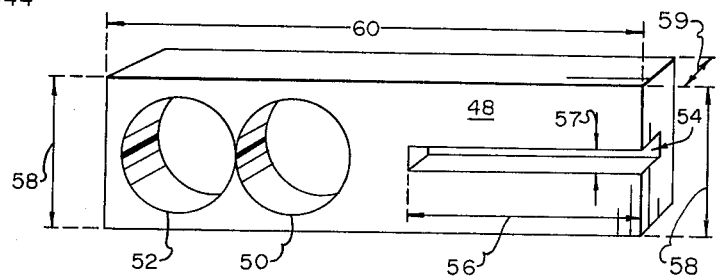
FIG. 3 is a perspective side view of a non-ferromagnetic spacer for use with the proximity switch of the instant invention.

Magnets 18A and 18B and the switch 20 are preferably set or positioned within a spacer 48 which is best shown in FIG. 3. The spacer 48 is made of a non-magnetic material. A solid nylon type material may be used. However, aluminum is preferred because of ease in forming the apertures 50 and 52 and the slot 54. The magnets 18A and 18B are placed in adjoining apertures 50 and 52 which are sized to snugly receive the magnets 18A and 18B therewithin. The slot 54 is sized to receive the switch 20 therewithin. The switch mechanism 20 is encased with a resilient non-ferromagnetic material. It may be encased in a soft silicon rubber or potting material. Preferably, the switch is encased by heat shrink tubing which is fitted thereover and shrunk to fit tightly thereabout in a conventional manner. The switch 20 as encased is then glued into the slot 53 with epoxy glue.

The spacer 48 in FIG. 1 is shown in cross-section as being made of nylon. However, the spacer 48 as herein noted, is preferably made of aluminum for ease of manufacture. The spacer 48 in FIG. 1 has an aperture 55 formed therein in lieu of the slot 54. The slot 54 is preferred for manufacturing cost considerations. The slot 54 is sized in length 56 and in cross-section to snugly receive the encased switch 20 and the associated conductors 34 and 36. The conductors 38 and 40 are preconnected to the switch 20 before the switch 20 is glued into the slot. In turn, the conductors 34 and 36 are also glued into place with excess glue. The aperture 55 is similarly sized; and switch 20 is similarly installed therein.

The spacer 48 is sized in height 58, width 59, and length 60 to receive the magnets 18 and the switch 20 and to flatly fit against the inside surface 28 of the front 14. The spacer 48 is a rigid structure which supports and retains the magnets 18A, 18B and switch 20. It also provides ready means to fix the relative positions of the switch 20 with relation to the magnetic flux field 26 generated by the magnets 18A and 18B. The spacer 48 is sized in height 58 to substantially the height of the chassis 12 so that it snugly fits therewithin to further provide structural rigidity and stability for the switch 20 and the magnets 18A and 18B. At the same time, the spacer 48 protects the magnets and the switch 20 against vibration and the related wear and damage associated with vibration. The encasement material surrounding the switch 20 further protects the switch 20 from vibration damage by cushioning or dampening the mechanical movements of vibration.

As best shown in FIG. 1, the detector 10 has two apertures 61 and 62 formed therethrough. The apertures 61 and 62 are in effect bolt holes to constitute means for mounting the detector 10 to structure as desired by the user. It may be noted that the apertures 61 and 62 extend through the height 64 of the detector 10 and are proportionally spaced along the length 66 of the detector 10.

The connector 24 is sealably positioned through an aperture formed in the chassis 12. The connector 24 is a water-tight and weather-tight connector which those skilled in the art will recognize to be readily available. The connector 24 is of the type having two external contact connections 66 and 68 to receive a coacting connector from an external circuit such as plug 70 in a male and female relationship.

A small aperture 72 is preferably formed in the rear 16 of the chassis 12. A set screw is inserted through the threaded aperture 72 to abut the shield 42 and hold the shield 42, the spacer 48 with magnet 18 and switch 20 firmly in place during the potting process. After assembly of the detector 10, conventional epoxy potting compound is put into the chassis 12. Thereafter, the set screw may be removed and the aperture filled with potting compound. The potting compound completely fills the void areas within the chassis 12. Sufficient compound is inserted to bring the compound to the outer ends 74 and 76 of the chassis 12. The compound completely encloses and encases the components within the chassis 12 to make it water-tight and weather-tight.

The proximity detector 10 of FIG. 1, operates to detect the proximity of a ferromagnetic object 78 with respect to the front 14 (or sensing surface) of the detector 10. As the object 78 approaches the front 14 of the detector 10, the magnetic flux field 26 is modified to cause the switch 20 and in particular the contacts 33 within the hermetically sealed chamber 32 to operate from a pre set condition. The closer the object 78 is to the front 14 of the detector 10, the stronger the magnetic field or magnetic flux 26 passing through the switch 20. As the ferromagnetic object 78 moves away from the face 14, the magnetic flux field 26 becomes weaker in turn causing the leaf or reed contacts within the chamber 32 in this embodiment to be open or nonconductive. Initial positioning of the contacts 33 in the absence of an object 78 so that the contacts are closed in the presence of the object 78 and are open when the object 78 is away from the front 14 is effected in manufacture by positioning the shield 42 within the chassis 12 and fixing the shield's position with the set screw used to hold the internal components in position for gluing. The contact rating of the contacts 33 within the hermetically sealed chamber 32 is preferably selected to be one-half of an ampere at 100 volts AC.

Figure 6:
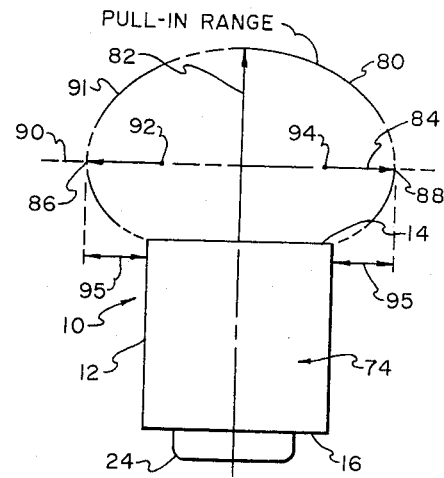

Referring in particular to FIG. 6, the pull-in-range 80 or sensitivity of the detector 10 is symbolically illustrated. The pull-in-range may be regarded as that range or distance at which the proximity of the ferromagnetic object 78 (FIG. 1) causes the detector 10 to indicate the presence of the object 78 which in this embodiment is the closing of the contacts 33 within the hermetically sealed container 32. The pull-in-range may be regarded to be elliptical in shape and is related to the strength of the magnetic flux field 26. The maximum distance 82 normal to the face or front 14 of the detector 10 is empirically set by the strength of the magnets 18A and 18B which in this embodiment is approximately and substantially $2\frac{1}{2}$ times the radius of curvature 84 taken at the points 86 and 88 where the conjugate diameter 90 of the ellipse intersects the perimeter 91 of the ellipse. Alternately, the radius 84 may be regarded as the radius of a circle having its center at either of the two foci 92 and 94 of the ellipse and having its perimeter tangentially intersect the perimeter 91 of the ellipse at points 86 and 88. It may also be noted that the pull-in-range or sensitivity field extends above and below the detector 10 a distance 95 from about one radius 84 to about $\frac{3}{8}$ of a radius 84.

Figure 7:
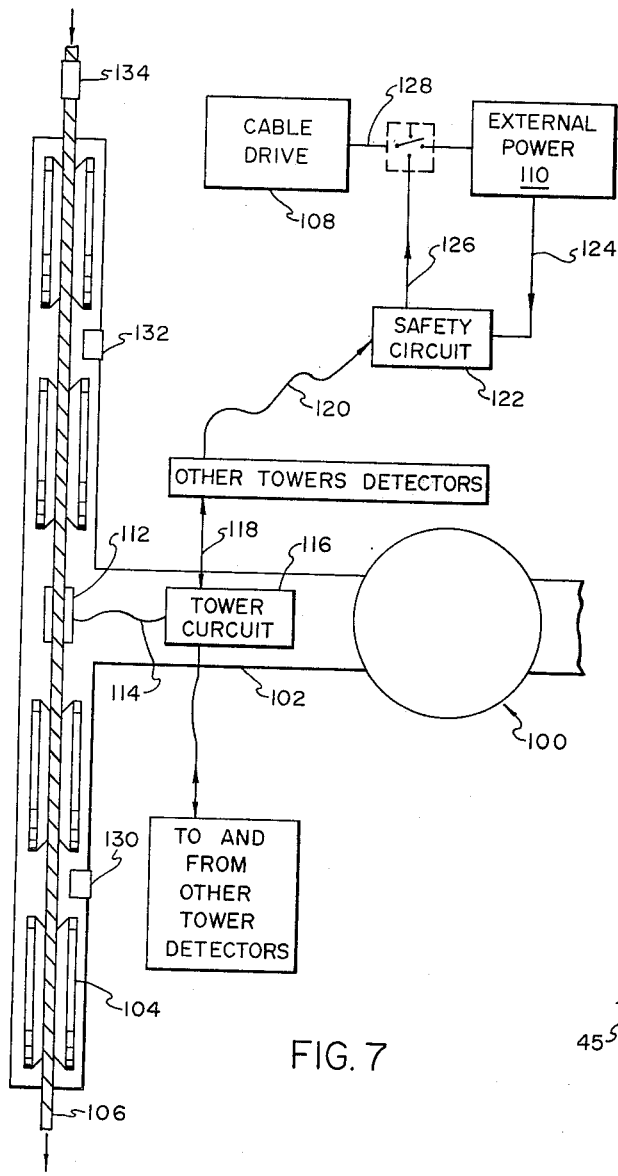
FIG. 7 is a partial cut view of a ski lift system tower with a representative block diagram of a ski lift safety system associated therewith.

Referring now to FIG. 7, a portion of a ski lift tower 100 is shown. The ski lift tower 100 has an arm 102 with grooved wheels 104 rotatably positioned thereon to receive in a tracking relationship the cable 106 from which ski lift chairs to bear skiers (personnel) are suspended. In operation, the cable 106 is rotated in a continous loop fashion by driving apparatus 108 which are powered from an external power source 110. Should the cable 106 become detracked (deroped) from the grooved wheels 104, imminent hazard to the personnel on the ski chair lift is extant. Even if personnel were not aboard, damage to equipment and apparatus could ensue. Accordingly, it is desirable, if not imperative, to reliably detect the position of the cable 106 by appropriate means. As here illustrated, a detector 112, comparable to the detector 10 of FIG. 1, is shown positioned proximate the cable 106 which is a steel or metal cable having ferromagnetic properties. With the detector 10 of FIG. 1 in position as shown in FIG. 7 as item 112, it can be seen that the cable 106 causes the detector 10 to be closed because the cable 106 strengthens the field traveling through the switch 20 and allows the contacts 33 within the hermetically sealed container 32 to remain closed. If a derope condition (cable 106 leaving the grooved wheels 104) occurs, the cable 106 will no longer be in the position as shown in FIG. 7. That is, the cable 106 will be outside the pull-in-range 82, as illustrated in and discussed with respect to FIG. 6. Accordingly, the contacts 33 will open by virtue of the magnetic field 26 of the permanent magnets 18A and 18B. That is, in the event of the occurrence of a dangerous condition, the permanent magnets cause the contacts to open. Further, in the event of any failure of the detector 10 to detect the contacts 33 will open. This may be regarded as a fail-safe apparatus because no electrical or mechanical operation other than the mechanical movement of the switch contacts 33 from the closed position to the open position is required to generate a "safe" signal.

As shown in FIG. 7, the detect signal of the detector 112 is transmitted by conductors 114 to tower circuitry 116. The tower circuitry 116 may be connected to other tower circuitry and detectors associated with the ski lift system. The open or derope condition which is detected by the detector 112 is transmitted by conductors 118 and 120 to safety circuitry 122 which is powered from an external power source 110 by conductor 124. The safety circuitry 122 receives the derope condition signal from the circuit 116 and in turn sends a shut-down signal to the cable drive via conductor 126 which as here illustrated is symbolically connected to a single pull single throw switch which is operable by the safety circuit 122 to cause it to go to an open condition to interrupt electrical power being supplied by the external power supply 110 to the cable drive 108 via conductor 128. A safety system with tower circuitry usable with the detector 10, 112 is more fully described and illustrated in U.S. Pat. No. 3,991,413 (Berger) and U.S. patent application Ser. No. 694,594, filed June 10, 1976 and now U.S. Pat. No. 4,088,988 (Berger).

It may be noted that other detectors 130 and 132 may be positioned on the tower arm 102 as desired by the user. It may also be noted that the detector 10 of FIG. 1 when positioned at the positions shown in FIG. 7 as items 112, 130 and 132 is not inhibited by the steel or metal structure typically used for arm 102 and tower 100. That is, stray magnetic fields from the metal structure associated with the tower 100 does not substantially affect operation of the proximity detector of the instant invention. Further, it may also be noted, that vibration from mechanical movement typically experienced in the tower 10 by virtue of the constantly moving cable and varying weights being supported by the tower 100 does not significantly adversely affect operation or the performance of the proximity detector of the instant invention.

Figure 8:
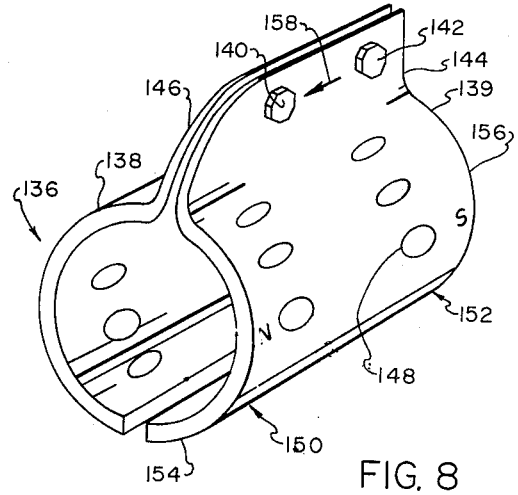
FIG. 8 is a perspective view of a test device for testing the proximity detector of the instant invention for use with a ski lift safety system.

The proximity detector of the instant invention may be tested using a test device illustrated in FIG. 8. The device has magnet means and means to adapt it to the cable 106. As here shown, the test device is sleeve 136 formed of two substantially symmetric halves 138, 139 which are fastened together with non-magnetic bolts 140 and 142 positioned through apertures formed in the flanges 144 and 146. Each half 138, 139 is formed as a semicircle so that the sleeve clamps tightly over the cable 106 (FIG. 7). Magnet means, here shown as a plurality of circular shaped magnets 148 which are positioned in two circumferential rows 150 and 152 proximate the leading edge 154 and trailing edge 156 of the sleeve 136. The permanent magnets 148 are chosen and positioned to form a north pole and a south pole, as shown. The leading edge 154 of the sleeve 136 is beveled or rounded with the flanges 144 and 146 cumbered to avoid mechanical jamming when installed on the cable 106 and circulated about the ski lift system towers in the direction of the arrow 158. The sleeve 136 is preferably made of aluminum or a comparable durable non-ferromagnetic material. As the sleeve 136 moves past the face of a detector 112 (FIG. 7), the magnetic field of the magnets 148 disrupts and modifies the field 26 of the detector 10 (112) to cause it to operate and send a derope detect signal.

It is to be understood that the embodiments of the invention described herein are merely illustrative of the application of the principals of the invention. Reference herein to details of the illustrated embodiment is not intended to limit the scope of the claims which themselves set forth those features regarded as essential to the invention.

I claim:

1. A detector for detecting the proximity of a ferromagnetic object comprising:

a substantially non-ferromagnetic chassis having a front and a rear:

magnet means comprised of a pair of substantially adjacent cylindrically shaped magnets positioned within said chassis proximte said front with the axis of each cylindrical magnet substantially normal thereto to produce a combined magnetic flux field about said magnets having an axis substantially normal to said front and wherein said magnetic flux field forms a pair of opposite magnetic poles along said axis;

a switch having contacts operable by magnetic flux, said switch being positioned proximate said front and said magnet means within said chassis with said contacts in the portion of the magnetic flux field which is essentially parallel to the axis of said magnetic flux field for operation by said field;

conductor means conductively connected to said switch;

connector means conductively connected to said conductor means and positioned with respect to said chassis for external connection to external circuit means;

shield means positioned within said chassis between the rear of said chassis and said magnet means and between the rear of said chassis and said switch to shield said magnet and said switch from extraneous magnetic fields and to focus said magnetic flux for operation of said contacts; and wherein said flux field is strengthened by a ferromagnetic object positioned within a predetermined distance from the front of said chassis and weakened upon positioning without said predetermined distance to cause the contacts of said switch to operate in relation to the positioning of said object and in turn send an operate signal reflective of said positioning to said external circuit via said conductor and connector means.

2. The detector of claim 1 further including a non-ferromagnetic spacer member positioned proximate the front of said chassis and with an aperture formed therein to snugly receive said switch.

3. The detector of claim 2 wherein said shield means is an elongated bar constructed of a deburred ferromagnetic material.

4. The detector of claim 2 wherein said switch is a reed switch which is encased within a thin layer of resilient non-ferromagnetic material and has an hermetically sealed chamber with said contacts positioned therein, electrical conductors extending from said contacts exterior said chamber and a ferromagnetic tab secured to each of said conductors proximate said chamber.

5. The detector of claim 4 wherein said tabs are made of core iron and are sized in length from about five to about fifteen millimeters in length and from about one to about eight millimeters in width.

6. The detector of claim 5 wherein said switch is covered with heat shrink tubing.

7. The detector of claim 4 wherein said spacer member is elongated in length and is formed to snugly receive said magnet means.

8. A detector for detecting the proximity of a ski lift system cable, said detector comprising:
 a substantially non-ferromagnetic chassis having a front and a rear;
 mounting means adapted to said chassis for mounting said detector to a ski lift tower proximate a ski lift cable;
 magnet means comprised of a pair of substantially adjacent cylindrically shaped magnets positioned within said chassis proximate said front with the axis of each cylindrical magnet substantially normal thereto to produce a combined magnetic flux field about said magnets having an axis substantially normal to said front and wherein said magnetic flux field forms a pair of opposite magnetic poles along said axis;
 a switch having contacts operable by magnetic flux, said switch being positioned proximate said front and said magnet means within said chassis with said contacts in the portion of the magnetic flux field which is essentially parallel to the axis of said magnetic flux field for operation by said field;
 conductor means conductively connected to said switch;
 connector means conductively connected to said conductor means and positioned with respect to said chassis for external connection to external circuit means;
 shield means positioned within said chassis between the rear of said chassis and said magnet means and between the rear of said chassis and said switch to shield said magnet and said switch from extraneous magnetic fields and to focus said magnetic field for operation of said contacts; and
 wherein said flux field is strengthened by the said cable positioned normally within a preselected pull-in range from the front of said chassis to cause the contacts of said switch to attain a normal condition, and wherein said flux field is weakened when said cable attains a condition outside said pull-in range to cause said contacts of said switch to attain an operate condition and to in turn send an operate signal reflective of the cable condition to said external circuit via said conductor and connector means.

9. In a ski lift safety system for use with a ski lift system having towers and a cable wherein the safety system has means to detect the deroping of said cable and supply operative safety signals in response thereto, an improved detection means comprising:
 a substantially non-ferromagnetic chassis having a front and a rear;
 mounting means adapted to said chassis for mounting said detector to a ski lift tower proximate a ski lift cable;
 magnet means comprised of a pair of substantially adjacent cylindrically shaped members magnets positioned within said chassis proximate said front with the axis of each cylindrical magnet substantially normal thereto to produce a combined magnetic flux field about said magnets having an axis substantially normal to said front and wherein said magnetic flux field forms a pair of opposite magnetic poles along said axis;
 a switch having contacts operable by magnetic flux, said switch being positioned proximate said front and said magnet means within said chassis with said contacts in the portion of the magnetic flux field of said magnet means which is essentially parallel to the axis of said magnetic flux field for operation by said field;
 conductor means conductively connected to said switch;
 connector means conductively connected to said conductor means and positioned with respect to said chassis for external connection to external circuit means;
 an elongated ferromagnetic shield positioned within said chassis between the rear of said chassis and said magnet means and between the rear of said chassis and said switch to shield said magnet and said switch from extraneous magnetic fields and to focus said magnetic field to pass through said contacts;
 a non-ferromagnetic spacer positioned proximate the front of said chassis with an aperture and formed therein to snugly receive said switch; and
 wherein said flux field is strengthened by said cable when positioned normally within a preselected pull-in range from the front of said chassis to cause the contacts of said switch to attain a normal condition, and wherein said flux field is weakened when said cable attains a derope condition outside of said pull-in range to cause said contacts of said switch to attain an operate condition and to in turn send an operate signal reflective of said derope condition to said external circuit via said conductor and connector means.

10. The improvement of claim 9 further including test means comprised of magnet means and attachment means for removably attaching said magnet means to said cable wherein said test means is transported past said detection means by said cable to modify the flux field of said detection means to in turn cause switch operation.

* * * * *